Figure 1:
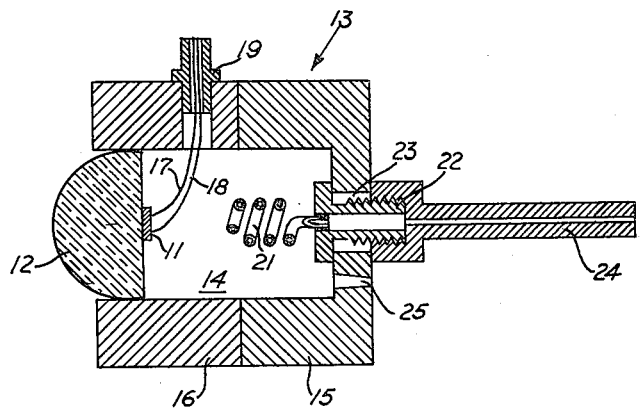

Feb. 26, 1963     F. L. HUTCHENS     3,079,504
COOLING DEVICE FOR INFRARED DETECTOR
Filed Dec. 20, 1956

INVENTOR.
FREDERICK L. HUTCHENS
BY
H. H. Losche
ATTORNEYS 3,079,504
COOLING DEVICE FOR INFRARED DETECTOR
Frederick L. Hutchens, Martinsville, Ind., assignor to the United States of America as represented by the Secretary of the Navy
Filed Dec. 20, 1956, Ser. No. 629,760
1 Claim. (Cl. 250—83)
(Granted under Title 35, U.S. Code (1952), sec. 266)

The invention described herein may be manufactured and used by or for the Government of the United States of America for governmental purposes without the payment of any royalties thereon or therefor.

The present invention relates to infrared detectors and more particularly to means for increasing the range sensitivity of infrared detctors by cooling the detectors.

The application of infrared to airborne fire control system is being rapidly expanded, and infrared detectors are now being designed to replace the radar gear in certain military aircraft. Infrared equipment is finding increased use as it has many advantages over other types of fire control equipment. Infrared equipment is light in weight, often a whole system will weigh less than two hundred pounds, and is simple in operation as the electronic circuits for infrared equipment are normally simple amplifiers. This simplicity reduces maintenance problems and also facilitates the training of personnel who operate and maintain the equipment. Furthermore, infrared equipment is inherently more accurate than radar as it has greater resolution and no side lobes to give ground return or sea clutter. However, the most important advantage of infrared equipment is the passive nature of the equipment and the difficulty of successful enemy countermeasures. No energy is emitted by the fire control system which can be used by an enemy for either detection or jamming.

While present day infrared equipment has the heretofore mentioned advantages, a series disadvantage has been the limited range of the equipment under all weather conditions. One of the main components affecting the range of an infrared system is the detector, which normally is either of the lead sulphide (PbS) or lead telluride (PbTe) type. It has been found that by cooling these detectors the sensitivity, and therefore the range, of these detectors is greatly increased. The cooling system should be simple in operation and of light construction so as not to add any substantial amount of weight to the infrared system. The present invention provides a novel manner of cooling a detector by providing a chamber within which the detector is located and vaporizing carbon dioxide inside the chamber.

It is therefore a general object of the present invention to increase the range capabilities of an infrared system by providing means for cooling the detector.

Figure 2:
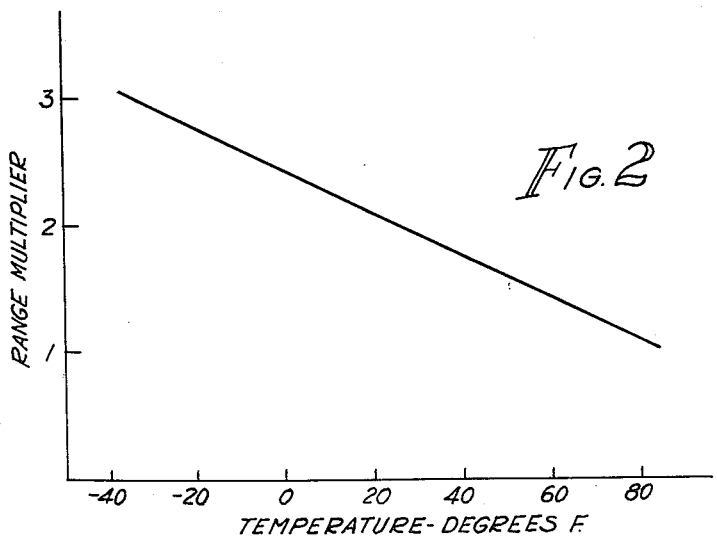

Other objects and many of the attendant advantages of this invention will be readily appreciated as the same becomes better understood by reference to the following detailed description when considered in connection with the accompanying drawing wherein:

FIGURE 1 is a sectional view showing a detector being cooled according to the principles of the present invention; and FIGURE 2 is a diagram showing the effect of cooling a detector.

Referring now to FIGURE 1 of the drawing, there is shown a detector 11, which preferably is of the lead sulphide (PbS) or lead telluride (PbTe) type, attached, as by cementing, to a lens 12. A housing 13, that is made of a material having good heat insulating properties, is provided with a chamber 14, and lens 12 is supported therein. Housing 13 is preferably made in two sections 15 and 16 to facilitate the assembly of the device. Leads 17 and 18 are provided on the cell 11 and are connected to a connector 19.

A coil of small tubing 21 is attached, as by soldering or brazing, to a threaded adapter 22 which passes through hole 23 in section 15 of housing 13 and threadedly connects with a hose connector 24. Adapter 22 and hose connector 24 are each provided with a passageway through which liquid can flow and when the hose connector 24 is connected to a liquid supply of carbon dioxide ($CO_2$), the $CO_2$ flows through the hose connector 24, adapter 22, and coil of tubing 21, and is then vaporized within chamber 14. A small tapered orifice 25 is provided to permit the escapage of the vaporized carbon dioxide. It has been found that liquid carbon dioxide performs better than carbon dioxide gas as a jet of $CO_2$ gas causes noise which interferes with the signal being transmitted by the detector.

For a constant output of an infrared detector cell, such as a lead sulfide detector, the power input is a function of cell temperature and can be expressed in equation form as:

(1) $$P_{in} = f(Tc)$$

With a constant target, such as a stationary object, the power input to a PbS cell is a function of range, and can be expressed in equation form as:

(2) $$P_{in} = g(R)$$

Now if the target and cell output are held constant, range multiplier can be plotted as a function of cell temperature, as shown in FIGURE 2 of the drawing. The graph shown in FIGURE 2 was plotted from empirical data, the value at 83° F. being taken as unity. This graph illustrates the effect of cooling a detector, for, as shown, cooling from a temperature of 83° F. to 23° F. will double the range capabilities of a detector, and at a temperature of −37° F., the range capabilities of a detector can be tripled. Thus it can be seen that the one main disadvantage of an infrared system, which is its limited range, can be eliminated by the device herein disclosed.

Obviously many modifications and variations of the present invention are possible in the light of the above teachings. For example, cooling liquids other than carbon dioxide might readily be used, also, if it is desirable to regulate the flow of coolant, a thermocouple and valve arrangement might readily be devised by those skilled in the art. It is therefore to be understood that the invention may be practiced otherwise than as specifically described.

What is claimed is:

An infrared detecting device comprising, a housing comprised of material having good heat insulating properties and having a chamber with first and second opposed openings therein, a lens mounted in the first opening of said chamber and having a lead sulphide detecting element attached thereto, a coil of tubing within said chamber and having an opened end in juxtaposition to said detecting element, a hose connector, and a threaded adapter passing through said second opening and connecting said coil of tubing and said hose connector whereby liquid carbon dioxide is passed through said coil of tubing and vaporized within said chamber thereby cooling said detecting element.

References Cited in the file of this patent
UNITED STATES PATENTS

| 710,957 | Dyer | Oct. 14, 1902 |
| 1,511,306 | Slate | Oct. 14, 1924 |
| 2,522,153 | Andrews | Sept. 12, 1950 |

(Other references on following page)

UNITED STATES PATENTS

| | | | |
|---|---|---|---|
| 2,544,261 | Gibson | Mar. 6, | 1951 |
| 2,547,173 | Rittner | Apr. 3, | 1951 |
| 2,711,084 | Bergan | June 21, | 1955 |
| 2,727,119 | Thomson | Dec. 13, | 1955 |
| 2,736,177 | Tice | Feb. 28, | 1956 |
| 2,749,715 | Tice | June 12, | 1956 |
| 2,768,527 | Stern et al. | Oct. 30, | 1956 |
| 2,788,381 | Baldwin | Apr. 9, | 1957 |
| 2,884,345 | Rocard et al. | Apr. 28, | 1959 |

OTHER REFERENCES

The Temperature Variation of the Long-Wave Limit of Infra-Red Photoconductivity in Lead Sulfied and Similar Substances, by T. S. Moss, Proceedings of the Physical Society, vol 62B, No. 359B, November 1, 1949, pp. 741–748.